US009164981B2

(12) United States Patent
Miyazaki et al.

(10) Patent No.: US 9,164,981 B2
(45) Date of Patent: Oct. 20, 2015

(54) INFORMATION PROCESSING APPARATUS, INFORMATION PROCESSING METHOD, AND PROGRAM

(75) Inventors: Mitsuhiro Miyazaki, Kanagawa (JP); Shingo Takamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 13/489,125

(22) Filed: Jun. 5, 2012

(65) Prior Publication Data

US 2012/0316865 A1 Dec. 13, 2012

(30) Foreign Application Priority Data

Jun. 13, 2011 (JP) .................................. 2011-131296

(51) Int. Cl.
*G06F 17/27* (2006.01)
(52) U.S. Cl.
CPC .................. *G06F 17/2785* (2013.01)
(58) Field of Classification Search
CPC ........................ G06F 17/3071; G06F 17/30705
USPC ................................................................. 704/9
See application file for complete search history.

(56) References Cited

U.S. PATENT DOCUMENTS

| 6,253,169 | B1* | 6/2001 | Apte et al. | 704/9 |
| 8,010,524 | B2* | 8/2011 | Chen et al. | 707/722 |
| 8,073,682 | B2* | 12/2011 | Stefik | 704/9 |
| 8,458,115 | B2* | 6/2013 | Cai et al. | 706/52 |
| 2005/0228783 | A1* | 10/2005 | Shanahan et al. | 707/3 |
| 2006/0069589 | A1* | 3/2006 | Nigam et al. | 705/1 |
| 2013/0218713 | A1* | 8/2013 | Gottfurcht et al. | 705/26.7 |
| 2014/0108954 | A1* | 4/2014 | Tonse et al. | 715/747 |

OTHER PUBLICATIONS

Weibe et al, "Identifying collocations for recognizing opinions," Jul. 2001, Proceedings of ACL/EACL '01 Workshop on Collocation, entire document.*
Hasegawa, T., et al., "Discovering Relations among Named Entities from Large Corpora", Proceedings of the Conference of the Association for Computational Linguistics 2004, (8 pages).

* cited by examiner

*Primary Examiner* — Jakieda Jackson
(74) *Attorney, Agent, or Firm* — Paratus Law Group, PLLC (57) ABSTRACT

An information processing apparatus performs topic analysis on one or more collected documents to calculate a probability indicating the degree of fitness of each sentence constituting the collected document for each item of a local topic, performs linguistic analysis on the collected document to detect a unique expression pattern in each item of the local topic, sets topic usefulness for each sentence constituting the collected document on the basis of evaluation of the sentence by an evaluator, sets a total evaluation value with respect to each item of the local topic on the basis of the topic analysis result and the topic usefulness, selects an item of the local topic on the basis of the total evaluation values, and extracts an appropriate sentence for a unique expression pattern in the selected item of the local topic from the collected document as a profound text candidate.

7 Claims, 7 Drawing Sheets

INFORMATION PROCESSING APPARATUS, INFORMATION PROCESSING METHOD, AND PROGRAM

BACKGROUND

The disclosure relates to an information processing apparatus, an information processing method and a program, and in particular, to an information processing apparatus, an information processing method and a program enabling extraction of profound text in which knowledge about attention targets, such as persons, content and thoughts, is stated from a huge amount of documents.

In the related art, attempts to obtain knowledge by statistically analyzing (performing statistical natural language processing on) a huge amount of documents have been widely made. For example, in a specialized field in which no thesaurus has been built, a thesaurus of the specialized field is automatically built by performing statistical natural language processing on documents in the specialized field.

In statistical natural language processing, a feature quantity of context information (indicating a word group consisting of a word attracting attention in a document and a predetermined number of words present before and after the word) is frequently used. Also, by calculating the degree of similarity in feature quantity of context information, analysis of synonyms of the word attracting attention, analysis of a polysemy, analysis of a relationship between two nouns, analysis of modality of a word, and the like are performed. For example, in the document "Discovering Relations among Named Entities from Large Corpora" by Takaaki Hasegawa, Satoshi Sekine and Ralph Grishman, in Proceedings of the Conference of the Association for Computational Linguistics 2004, a feature quantity of context information is used in synonym analysis of the relationship of a proper noun.

SUMMARY

The Internet contains a huge amount of documents in which attention targets, such as persons, content and thoughts, are stated. There is a technique of merely searching such a huge amount of documents for a document in which an attention target is stated and also summarizing the document of the search result, but no technique of extracting profound text in which knowledge about an attention target is stated has been established.

Here, profound text indicates a document that states a predetermined topic (local topic) relating to an attention target with a distinguishing expression (expression pattern).

The present disclosure is a reflection of such a situation, and enables extraction of profound text from a huge amount of documents.

An information processing apparatus, which is one aspect of the present disclosure, includes: a collection unit which collects a document consisting of one or more sentences; a topic analysis unit which calculates a probability indicating the degree of fitness of each sentence constituting the collected document for each item of a local topic by performing topic analysis on the collected document; a language analysis unit which detects a unique expression pattern in each item of the local topic by performing linguistic analysis on the collected document; an evaluation setting unit which sets topic usefulness for each sentence constituting the collected document on the basis of evaluation of the sentence by an evaluator, and sets a total evaluation value with respect to each item of the local topic on the basis of the topic analysis result and the topic usefulness; and a profound text extraction unit which selects an item of the local topic on the basis of the total evaluation values, and extracts appropriate sentences for a unique expression pattern in the selected item of the local topic from the collected document as profound text candidates.

The profound text extraction unit can select the item of the local topic on the basis of the total evaluation values, and extract appropriate sentences for the unique expression pattern in the selected item of the local topic from a collected extraction-target document as profound text candidates.

The evaluation setting unit can set the degree of profundity of each sentence constituting the collected document on the basis of the evaluation of the sentence by the evaluator, perform machine learning on a multidimensional feature quantity and the degree of profundity of the sentence, and thereby determine a boundary of a distribution of profound text over a multidimensional feature quantity space, and the profound text extraction unit can extract the profound text from the profound text candidates on the basis of the determined boundary.

The information processing apparatus, which is the one aspect of the present disclosure, can further include a presentation unit which presents a profound text candidate corresponding to a designated attention target or the profound text to a user.

The information processing apparatus, which is the one aspect of the present disclosure, can further include an editing unit which edits the collected document.

An information processing method, which is one aspect of the present disclosure, of an information processing apparatus including a collection unit which collects a document consisting of one or more sentences, a topic analysis unit which calculates a probability indicating the degree of fitness of each sentence constituting the collected document for each item of a local topic by performing topic analysis on the collected document, a language analysis unit which detects a unique expression pattern in each item of the local topic by performing linguistic analysis on the collected document, an evaluation setting unit which sets topic usefulness for each sentence constituting the collected document on the basis of evaluation of the sentence by an evaluator, and sets a total evaluation value with respect to each item of the local topic on the basis of the topic analysis result and the topic usefulness, and a profound text extraction unit which selects an item of the local topic on the basis of the total evaluation values, and extracts appropriate sentences for a unique expression pattern in the selected item of the local topic from the collected document as profound text candidates, includes: a first collection step of collecting, by the collection unit, a learning-target document consisting of one or more sentences; a topic analysis step of performing, by the topic analysis unit, topic analysis on the collected learning-target document to calculate a probability indicating the degree of fitness of each sentence constituting the learning-target document for each item of a local topic; a linguistic analysis step of performing, by the language analysis unit, linguistic analysis on the collected learning-target document to detect a unique expression pattern in each item of the local topic; an evaluation setting step of setting, by the evaluation setting unit, topic usefulness for each sentence constituting the collected learning-target document on the basis of evaluation of the sentence by an evaluator, and setting a total evaluation value with respect to each item of the local topic on the basis of the topic analysis result and the topic usefulness; a second collection step of collecting, by the collection unit, an extraction-target document consisting of one or more sentences; and a profound text extraction step of selecting, by the profound text extraction unit, an item of the local topic on the basis of the total evaluation values, and extracting an appropriate sentence for a unique expression pattern in the selected item of the local topic from the collected extraction-target document as a profound text candidate.

A program, which is one aspect of the present disclosure, causes a computer to function as: a collection unit which collects a document consisting of one or more sentences; a topic analysis unit which calculates a probability indicating the degree of fitness of each sentence constituting the collected document for each item of a local topic by performing topic analysis on the collected document; a language analysis unit which detects a unique expression pattern in each item of the local topic by performing linguistic analysis on the collected document; an evaluation setting unit which sets topic usefulness for each sentence constituting the collected document on the basis of evaluation of the sentence by an evaluator, and sets a total evaluation value with respect to each item of the local topic on the basis of the topic analysis result and the topic usefulness; and a profound text extraction unit which selects an item of the local topic on the basis of the total evaluation values, and extracts appropriate sentences for a unique expression pattern in the selected item of the local topic from the collected document as profound text candidates.

In one aspect of the present disclosure, a learning-target document consisting of one or more sentences is collected, a probability indicating the degree of fitness of each sentence constituting the collected document for each item of a local topic is calculated by performing topic analysis on the collected learning-target document, and a unique expression pattern in each item of the local topic is detected by performing linguistic analysis on the collected learning-target document. In addition, topic usefulness for each sentence constituting the collected learning-target document is set on the basis of evaluation of the sentence by an evaluator, and a total evaluation value with respect to each item of the local topic is set on the basis of the topic analysis result and the topic usefulness. Furthermore, an extraction-target document consisting of one or more sentences is collected, an item of the local topic is selected on the basis of the total evaluation values, and an appropriate sentence for a unique expression pattern in the selected item of the local topic is extracted from the collected learning-target document as a profound text candidate.

According to one aspect of the present disclosure, it is possible to extract profound text from a huge amount of documents.

DETAILED DESCRIPTION OF THE EMBODIMENT(S)

Hereinafter, the best mode for implementing the present disclosure (referred to as an embodiment below) will be described in detail with reference to the drawings.

1. Embodiment

[Overview of Profound Text Extraction Apparatus]

Figure 1:
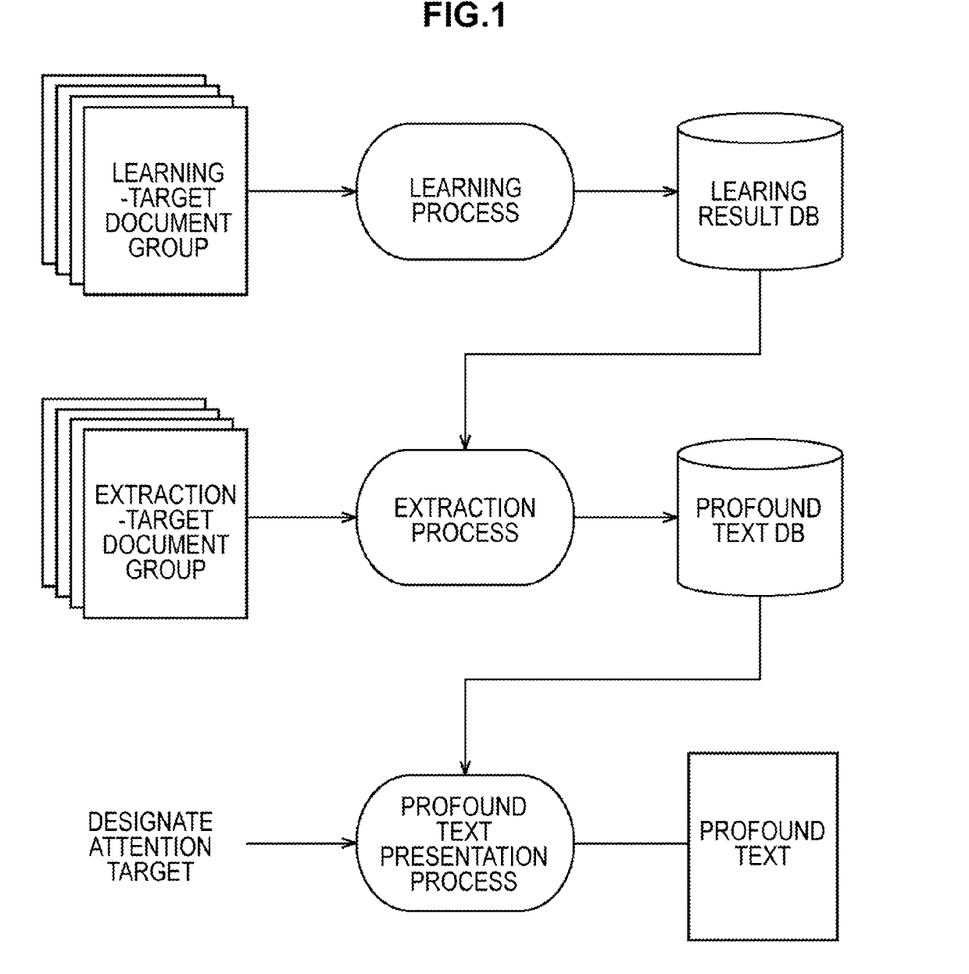
FIG. 1 is a diagram showing an overview of operation of a profound text extraction apparatus which is an embodiment of the present disclosure.

FIG. 1 shows an overview of operation of a profound text extraction apparatus which is an embodiment of the present disclosure. The profound text extraction apparatus which is an embodiment of the present disclosure performs three types of processes, a learning process, an extraction process and a profound text presentation process.

In the learning process, among documents in which attention targets such as persons, content and thoughts are stated, documents of which stated content is considered to be reliable are acquired as a learning-target document group. The documents considered to be reliable are acquired from sites on which official information on the attention targets is put on the Internet. For example when an attention target is a singer (person), information released in an official web page, a web page of an affiliated record company, Wikipedia and the like is acquired from the Internet. Otherwise, documents written by music critics and the like may be directly acquired. Here, the learning-target document group consists of a plurality of learning-target documents, and each of the learning-target documents consists of one or more sentences (referred to as learning-target sentences below).

Also, in the learning process, a topic (local topic) suited to profound text is selected on the basis of the learning-target document group. Further, a unique expression (expression pattern) that is frequently shown in the profound text is learned.

In the extraction process, documents in which attention targets such as persons, content and thoughts are stated are collected from the Internet regardless of reliability and determined as an extraction-target document group, and a document having the unique expression (expression pattern) that is frequently shown in the profound text is extracted from the extraction-target document group and stored as a database. Here, the extraction-target document group consists of a plurality of extraction-target documents, and each of the extraction-target documents consists of one or more sentences (referred to as extraction-target sentences below). A learning-target document may be used for an extraction-target document.

In the profound text presentation process, profound text corresponding to a designated attention target is presented to a user. At this time, it is possible to introduce the profound text and a product such as content relating to the attention target to the user, and also sell the product to the user. By devising a method of designating an attention target, it is possible to suggest purchase of a rare product unexpected by a user.

[Configuration Example of Profound Text Extraction Apparatus]

Figure 2:
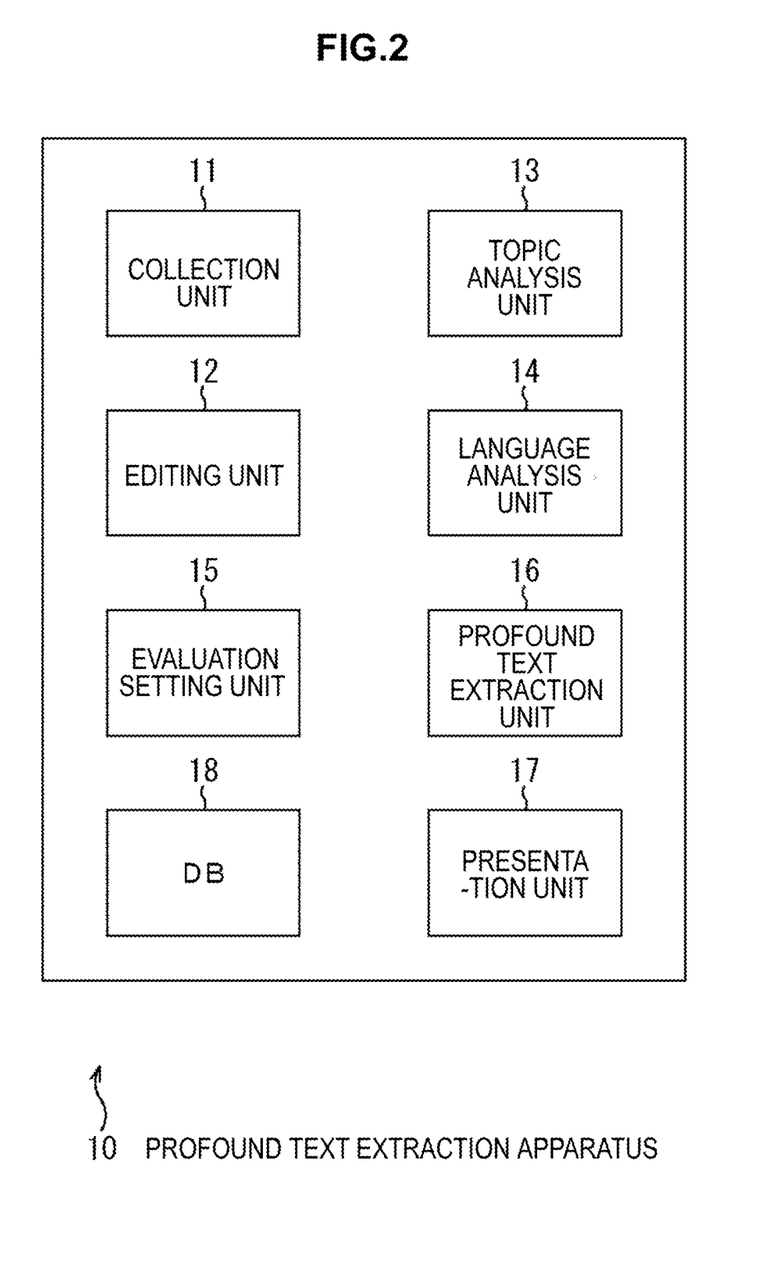
FIG. 2 is a block diagram showing a configuration example of a profound text extraction apparatus.

FIG. 2 shows a configuration example of a profound text extraction apparatus which is an embodiment of the present disclosure. This profound text extraction apparatus 10 includes a collection unit 11, an editing unit 12, a topic analysis unit 13, a language analysis unit 14, an evaluation setting unit 15, a profound text extraction unit 16, a presentation unit 17, and a database (DB) 18.

The collection unit 11 accesses a predetermined server on the Internet and acquires a learning-target document group relating to several attention targets. Also, the collection unit 11 accesses a predetermined server on the Internet and acquires an extraction-target document group relating to the several attention targets. Here, the collection unit 11 can also acquire a learning-target document group and an extraction-target document group from somewhere other than the Internet.

The editing unit 12 is intended to input and edit a document by manpower, and appropriately edits acquired learning-target documents and extraction-target documents according to manipulation of an operator. Also, when an attention target is, for example, a singer, the editing unit 12 supplies the collection unit 11 with review text written by a music critic as a learning-target document. The acquired and edited learning-target documents and extraction-target documents are stored and maintained to correspond to the attention targets in the DB 18.

The topic analysis unit 13 performs topic analysis on each learning-target document. Specifically, the topic analysis unit 13 calculates a probability indicating the degree of fitness of each learning-target document for each of all items of a global topic (general classification) prepared in advance as a value ranging from 0.0 to 1.0, and a probability indicating the degree of fitness of each learning-target sentence constituting a learning-target document for each of all items of a local topic (detailed classification) prepared in advance as a value ranging from 0.0 to 1.0. Likewise, the topic analysis unit 13 also performs topic analysis on the extraction-target documents.

For example, when an attention target is a singer, a J-POP type, a jazz type, a heavy metal type, a rock type, an Enka type and the like are prepared according to a music style of the singer as items of a global topic for learning-target documents. Also, as items of a local topic for learning-target documents, a hit song type, a growth type, a gossip type, a collaboration type and the like are prepared according to content of a sentence.

Figure 3:
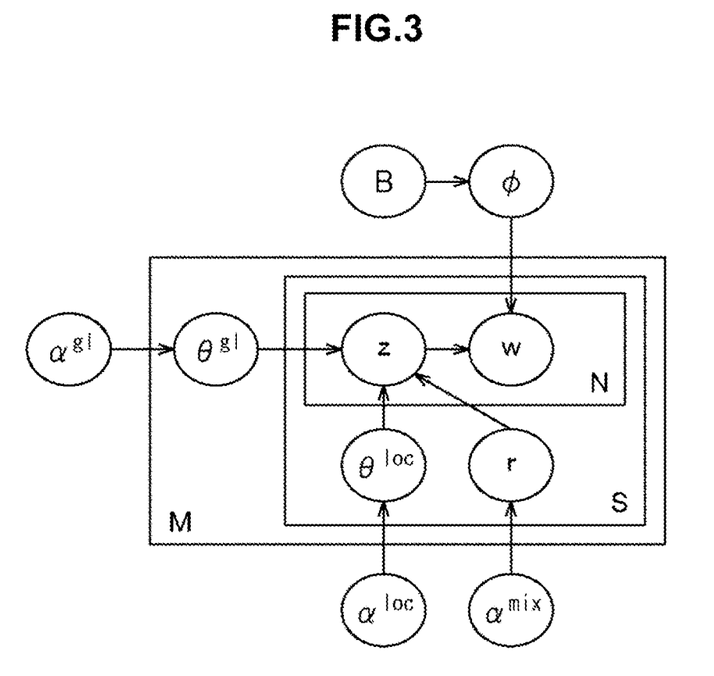
FIG. 3 is a diagram showing a probability model assumed in topic analysis.

FIG. 3 shows a probability model assumed in topic analysis. In the drawing, M denotes the number of documents, S denotes the number of sentences, and N denotes the number of elements of a feature quantity of each sentence. Also, a superscript gl denotes a relation to a global topic, and a superscript loc denotes a relation to a local topic.

In this probability model, a global topic and a local topic are represented as a multinomial distribution over predetermined dictionary words. There is a global topic for a learning-target document, and there are different local topics for a learning-target sentence.

The process of generating a sentence is as follows. For example, with the number of documents determined as M, the number of sentences constituting each document determined as S, and the number of elements of a feature quantity of each sentence determined as N, the number of global topics and the number of local topics are set to values ranging from 10 to 100. Elements of a feature quantity are generated in a generation process below. The respective elements of the feature quantity are sequenced.

For all documents, (1) a word generation probability regarding each topic is generated from a directory distribution $p(\theta|\alpha)$.]

For each document, (2) a topic generation probability of the document is generated from a Dirichlet distribution $p(\theta^{gl}|\alpha^{gl})$.

For each sentence, (3) a topic ratio of the sentence is generated from a Dirichlet distribution $p(\theta^{loc}|\alpha^{loc})$.

(4) a mixture ratio between global topics and local topics is generated from a Dirichlet distribution $p(r|\alpha^{mix})$.

For each element of a feature quantity, (5) it is selected whether the element is a global topic or a local topic on the basis of a topic mixture ratio between global topics and local topics.

(6) a topic is selected from a topic ratio corresponding to the selected topic (here, which topic is selected is expressed by a latent variable z; and a distribution showing a generation process of z shown in the generation process of (5) and (6) is expressed as $p(z|\theta^{gl}, \theta^{Loc}, r)$).

(7) an element w of a feature quantity is generated from a multinomial distribution $p(w|\Phi, \cdot z)$ according to the selected topic.

The generation process can be expressed using Expression (1) below.

$$p(w,z,r,\theta^{gl},\theta^{loc},\pi,\phi|\alpha^{gl},\alpha^{loc},\alpha^{mix},\beta) = p(w|z,\phi)p(z|\theta^{gl},\theta^{loc},r)p(r|\pi)p(\theta^{gl}|\alpha^{gl})p(\theta^{loc}|\alpha^{loc})p(\pi|\alpha^{mix})p(\phi|\beta) \quad (1)$$

In topic analysis, with a learning-target document determined as a document generated through the process described above, the corresponding latent variable is estimated by statistically analyzing an assumed feature quantity of each sentence.

Specifically, the latent variable is estimated by Gibbs sampling as shown in Expression (2) below.

$$p(z_{ijk} = t, r_{ijk} = r | w_{ijk} = v, \ldots) \quad (2)$$

$$\propto \begin{cases} \dfrac{c(\cdot,\cdot,t,v)+\beta}{c(\cdot,\cdot,t,\cdot)+V\beta} \cdot \dfrac{c(i,\cdot,t,\cdot)+\alpha^{gl}}{c(i,\cdot,\cdot,\cdot)+T^{gl}\alpha^{gl}} \cdot \\ \quad \dfrac{c(i,j,doc,\cdot)+\alpha^{mix}}{c(i,j,\cdot,\cdot)+2\alpha^{mix}} & \text{if } r_{ijo}=doc \\[6pt] \dfrac{c(\cdot,\cdot,t,v)+\beta}{c(\cdot,\cdot,t,\cdot)+V\beta} \cdot \dfrac{c(i,j,t,\cdot)+\alpha^{loc}}{c(i,j,\cdot,\cdot)+T^{loc}\alpha^{loc}} \cdot \\ \quad \dfrac{c(i,j,loc,\cdot)+\alpha^{mix}}{c(i,j,\cdot,\cdot)+2\alpha^{mix}} & \text{if } r_{ijt}=con \end{cases}$$

Here, $c(i, j, t, v)$ is a number of times that a topic t and a word v are generated in a j-th sentence of an i-th learning-target document. "·" denotes addition of the elements. loc denotes marginalization of a local topic. gl denotes marginalization of a global topic. A subscript ijk denotes a k-th feature quantity element of a j-th sentence in an i-th document. $r_{ijk}$ denotes which between a global topic and a local topic is selected when the element of the feature quantity is generated. $T^{gl}$ denotes the number of items of a global topic. $T^{loc}$ denotes the number of items of a local topic. "if $r_{ijk}$=gl" denotes a case in which a global topic is selected. "if $r_{ijk}$=loc" denotes a case in which a local topic is selected.

In this way, a parameter and a latent variable are calculated as shown in Expression (3) below.

$$\phi_{tv} \propto c(\cdot,\cdot,t,v)+\beta$$

$$\theta_{it} \propto c(i,\cdot,t,\cdot)+\alpha^{gl} \text{ if } t \in doc$$

$$\theta_{ijt} \propto c(i,j,t,\cdot)+\alpha^{loc} \text{ if } t \in con \quad (3)$$

Here, $\theta_{tv}$ is a generation probability of a v-th feature quantity element in a multidimensional distribution of the topic t. $\theta_{it}$ is a probability that an i-th learning-target document will generate a t-th global topic. $\theta_{ijt}$ is a probability that a j-th sentence of the i-th learning-target document will generate a t-th local topic. "if t∈gl" denotes a case in which a topic is included in a global topic. "if t=loc" denotes a case in which a topic is included in a local topic.

Refer back to FIG. 2. The language analysis unit 14 analyzes learning-target sentences on which topic analysis has been performed, and detects a frequently shown unique expression (expression pattern) in each item of the local topic. For example, when an attention target is a singer, "in . . . chart," "hit song", "ranked No. . . . , . . . copies have been sold" and the like are detected as expression patterns from a hit song type item of a local topic. Also, from a gossip type item, "according to rumors", " . . . scandal has been revealed", "photographed by paparazzi" and the like are detected as expression patterns.

The evaluation setting unit 15 averages five-grade evaluations (from the minimum evaluation of 1 to the maximum evaluation of 5) of each learning-target sentence by a plurality of evaluators, and sets topic usefulness and the degree of profundity of the learning-target sentence. Here, the topic usefulness is evaluated on the basis of whether content of the learning-target sentence attracts interest, whether the content is amusing, and the like. The degree of profundity is evaluated on the basis of whether the content of the learning-target sentence has been stated with an appropriate expression pattern for accumulated text, and the like. Likewise, the evaluation setting unit 15 also sets topic usefulness and the degrees of profundity of extraction-target sentences.

Also, for each learning-target document, the evaluation setting unit 15 multiplies a probability of each item of the local topic calculated by the topic analysis unit 13 and set topic usefulness, thereby calculating an evaluation value (=probability×topic usefulness) with respect to the item of the local topic. Moreover, the evaluation setting unit 15 adds evaluation values of all the learning-target sentences with respect to each item of the local topic to calculate a total evaluation value of the item, and normalizes the total evaluation value of the item so that the maximum of the total evaluation value of the item becomes 1.0. In this way, a normalized total evaluation value is set for each item of the local topic.

Furthermore, the evaluation setting unit 15 makes a threshold determination on the degree of profundity set for each learning-target sentence, recognizes a learning-target sentence of which the degree of profundity is equal to or greater than a predetermined threshold value (for example, 4) as profound text, and does not recognize a learning-target sentence of which the degree of profundity is less than the threshold value (for example, 4) as profound text. Also, the evaluation setting unit 15 performs morpheme analysis on each learning-target sentence, determines the analysis results as multidimensional feature quantities, and distributes the respective learning-target documents over a multidimensional feature quantity space. The recognition result of the profound text and the multidimensional feature quantities are machine-learned using a Support Vector Machine (SVM). In this way, in the multidimensional feature quantity space in which the respective learning-target documents are distributed, a boundary that most generally distinguishes between sentences determined as profound text and sentences not determined as profound text is determined.

The profound text extraction unit 16 selects an item of the local topic of which a normalized total evaluation value set by the evaluation setting unit 15 is equal to or greater than a threshold value (for example, 0.7). Also, the profound text extraction unit 16 acquires a unique expression pattern in the selected item of the local topic from the language analysis unit 14, and extracts an appropriate extraction-target sentence for the acquired expression pattern from the extraction-target document group as a profound text candidate.

For example, when a hit song type item of the local topic is selected and an expression pattern "in . . . chart" is detected from the item, profound text candidates "The latest song hit No. 1 in the Billboard Hot 100 chart!" and the like are extracted from the extraction-target document group. Also, for example, when a gossip type item of the local topic is selected and an expression pattern "according to rumors" is detected from the item, profound text candidates "According to rumors, they are likely to break up soon" and the like are extracted from the extraction-target document group.

Moreover, the profound text extraction unit 16 obtains multidimensional feature quantities of profound text candidates by performing morpheme analysis on the profound text candidates, and distributes the profound text candidates over the multidimensional feature quantity space. Furthermore, the profound text extraction unit 16 extracts profound text from the profound text candidates according to the boundary determined by the evaluation setting unit 15 using the SVM.

The presentation unit 17 presents profound text corresponding to the designated attention target to the user. Designation of the attention target may be performed by the user, or by the presentation unit 17 on the basis of a play list made by the user, a manipulation history of the user, and the like. Also, the presentation unit 17 introduces and also sells a product such as content relating to the attention target according to a reaction of the user to the presented profound text.

The DB 18 stores the acquired learning-target document group and extraction-target document group to correspond to the attention targets. Also, the DB 18 stores the extracted profound text to correspond to the attention targets. Further, the DB 18 appropriately stores process results of respective units such as expression patterns in respective items of local topics that can be obtained as results of topic analysis and language analysis of the learning-target document group and the extraction-target document group.

[Description of Operation]

Figure 4:
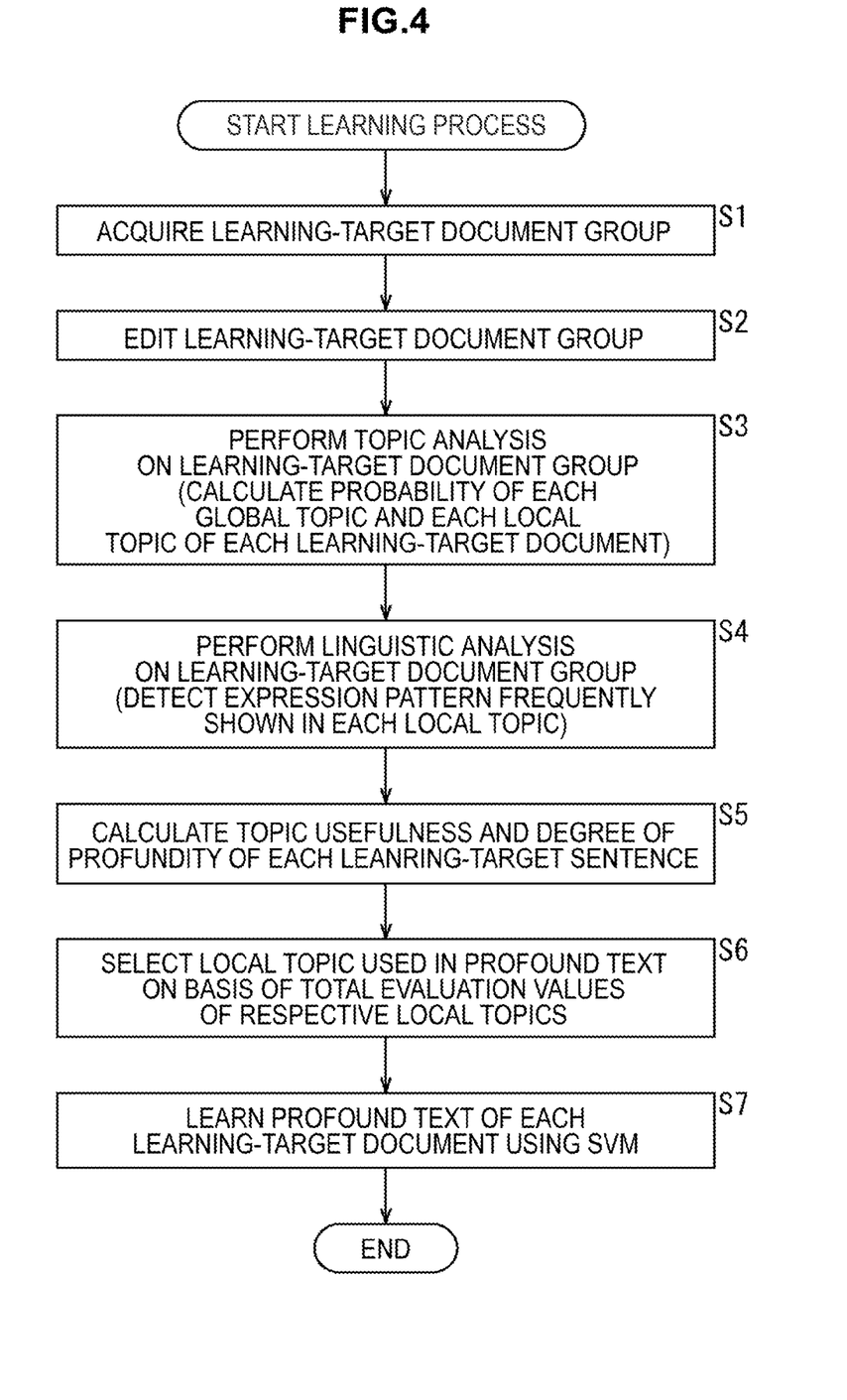
FIG. 4 is a flowchart illustrating a learning process.

FIG. 4 is a flowchart illustrating a learning process by the profound text extraction apparatus 10.

In step S1, the collection unit 11 acquires a learning-target document group relating to several attention targets. In step S2, the editing unit 12 appropriately edits acquired learning-target documents according to manipulation of an operator.

In step S3, the topic analysis unit 13 performs topic analysis on the learning-target document group. Specifically, the topic analysis unit 13 calculates a probability indicating the degree of fitness of each learning-target document for each of all items of a global topic (general classification) prepared in advance as a value ranging from 0.0 to 1.0, and a probability indicating the degree of fitness of each learning-target sentence constituting a learning-target document for each of all items of a local topic (detailed classification) prepared in advance as a value within a range from 0.0 to 1.0.

In step S4, the language analysis unit 14 analyzes the learning-target documents on which topic analysis has been performed, and detects a frequently shown unique expression (expression pattern) in each item of the local topic.

In step S5, the evaluation setting unit 15 sets topic usefulness and the degrees of profundity of learning-target sentences.

In step S6, the evaluation setting unit 15 multiplies a probability of each item of the local topic obtained through topic analysis of step S3 and set topic usefulness, thereby calculating an evaluation value with respect to the item of the local topic. Also, the evaluation setting unit 15 adds evaluation values of all the learning-target sentences with respect to each item of the local topic to calculate a total evaluation value of the item, and normalizes the total evaluation value of the item so that the maximum of the total evaluation value of the item becomes 1.0. The profound text extraction unit 16 selects an item of which a normalized total evaluation value set by the evaluation setting unit 15 is equal to or greater than a predetermined threshold value.

In step S7, the evaluation setting unit 15 makes a threshold determination on the degree of profundity set for each learning-target sentence, recognizes a learning-target sentence of which the degree of profundity is equal to or greater than a predetermined threshold value as profound text, and does not recognize a learning-target sentence of which the degree of profundity is less than the threshold value as profound text. Also, the evaluation setting unit 15 performs morpheme analysis on each learning-target sentence, determines the analysis results as multidimensional feature quantities, and distributes the respective learning-target documents over a multidimensional feature quantity space. The recognition result of the profound text and the multidimensional feature quantities are machine-learned using an SVM. In this way, in the multidimensional feature quantity space in which the respective learning-target documents are distributed, a boundary that most generally distinguishes between sentences determined as profound text and sentences not determined as profound text is determined. Then, the learning process is finished.

Figure 5:
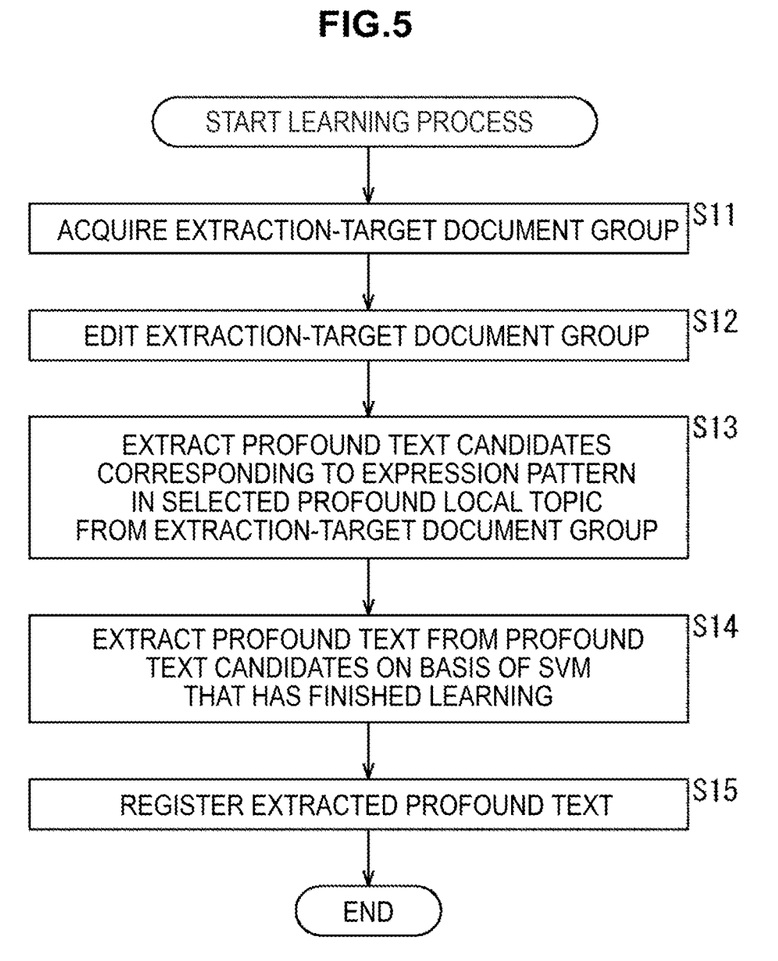
FIG. 5 is a flowchart illustrating an extraction process.

Next, FIG. 5 is a flowchart illustrating an extraction process by the profound text extraction apparatus 10. The extraction process is performed on the assumption that the learning process has been performed already.

In step S11, the collection unit acquires an extraction-target document group relating to the several attention targets. In step S12, the editing unit 12 appropriately edits acquired extraction-target documents according to manipulation of an operator.

In step S13, the profound text extraction unit 16 acquires a unique expression pattern (detected in step S4 of the learning process) in the item of the local topic selected in step S6 of the learning process from the language analysis unit 14, and extracts appropriate extraction-target sentences for the acquired expression pattern from the extraction-target document group as profound text candidates.

In step S14, the profound text extraction unit 16 obtains multidimensional feature quantities of the profound text candidates by performing morpheme analysis on the profound text candidates, distributes the profound text candidates over a multidimensional feature quantity space, and extracts profound text from the profound text candidates according to the boundary determined using the SVM in step S7 of the learning process. In step S15, the DB 18 stores the extracted profound text to correspond to the attention targets Here, the process of step S14 may be omitted to store all the profound text candidates as profound text in the DB 18 as they are. Then, the extraction process is finished.

Through the learning process and the extraction process, it is possible to extract profound text from a large amount of extraction-target documents. In this way, it is possible to prepare profound text about, for example, various products for each item of a local topic in advance.

Figure 6:
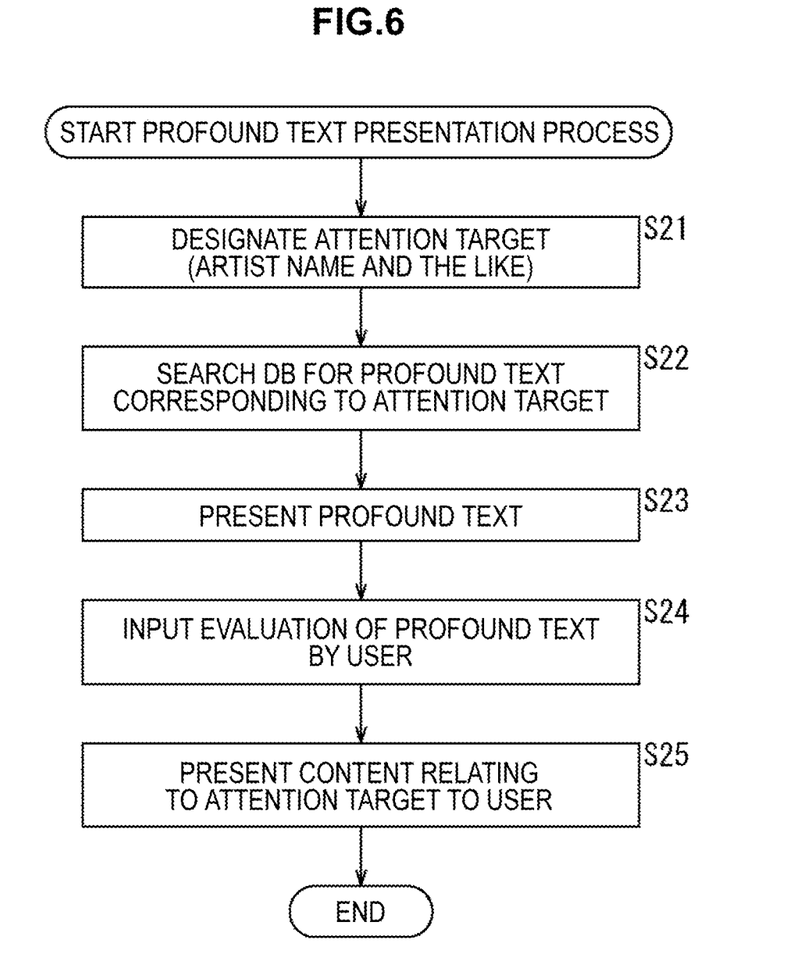
FIG. 6 is a flowchart illustrating a profound text presentation process.

Next, FIG. 6 is a flowchart illustrating a profound text presentation process by the profound text extraction apparatus 10. The profound text presentation process is performed on the assumption that the learning process and the extraction process have been performed already.

In step S21, the presentation unit 17 designates, for example, a singer name input by a user, as an attention target.

In step S22, the presentation unit 17 searches the DB 18 for profound text corresponding to the attention target designated in step S21, and in step S23, presents the profound text of the search result to the user.

In step S24, the presentation unit 17 receives evaluation of the presented profound text (for example, amusing, boring or known profound text) by the user. In step S25, the presentation unit 17 presents a product such as content relating to the designated attention target to the user according to the evaluation by the user input in step S24. At this time, electronic data such as content may also be transferred by streaming or sold by downloading. Then, the profound text presentation process is finished.

Through the profound text presentation process, it is possible to use profound text as a recommendation reason for introducing a product to a user. Also, it is possible to give the user a chance to have interest in an unknown area or content.

A series of the processes described above can be performed by hardware or software. When the series of processes is performed by software, a program constituting the software is installed in a computer incorporated in dedicated hardware, a computer, for example, a general purpose personal computer, capable of performing a variety of functions by installing various programs, or the like from a program recording medium.

Figure 7:
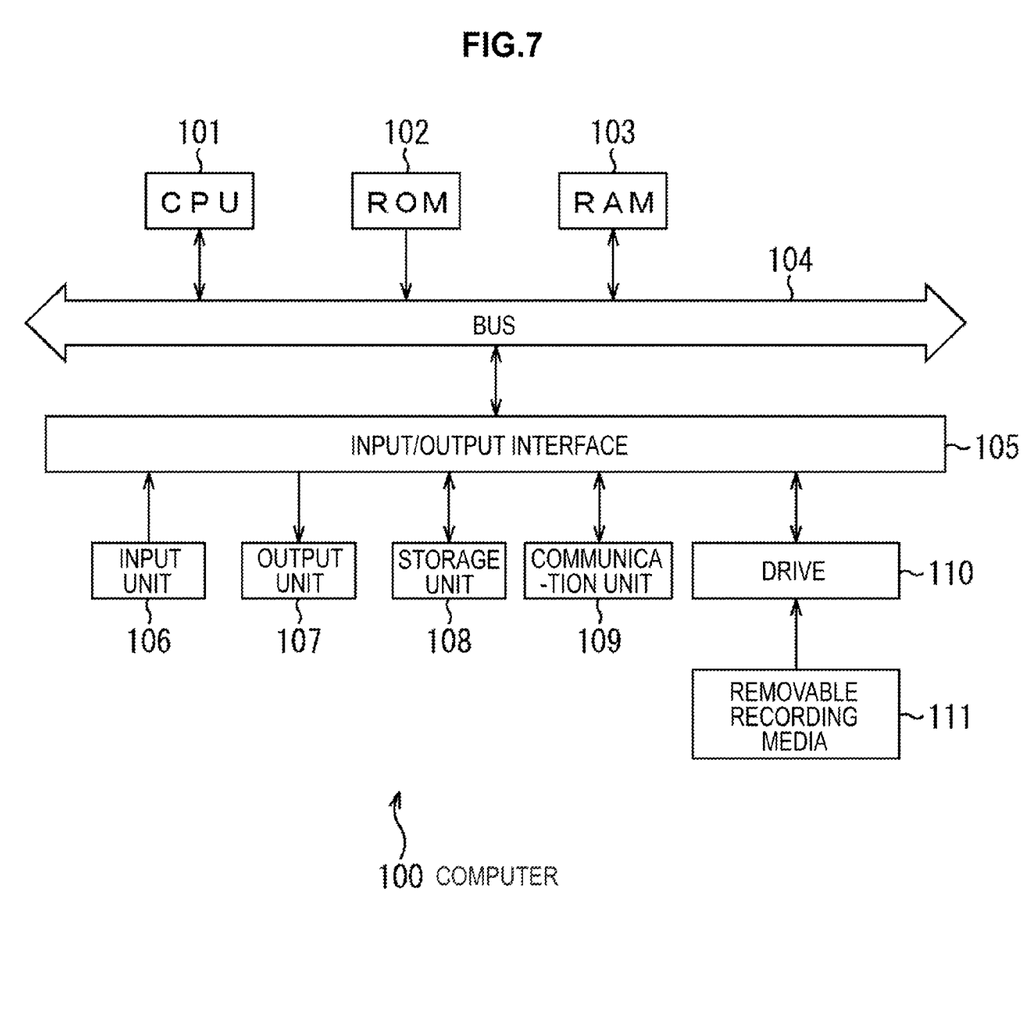
FIG. 7 is a block diagram showing a configuration example of a computer.

FIG. 7 is a block diagram showing a configuration example of a computer that performs the series of processes described above by a program.

In this computer 100, a Central Processing Unit (CPU) 101, a Read Only Memory (ROM) 102 and a Random Access Memory (RAM) 103 are connected with each other through a bus 104.

Also, an input/output interface 105 is connected to the bus 104. To the input/output interface 105, an input unit 106 consisting of a keyboard, a mouse, a microphone and the like, an output unit 107 consisting of a display, a speaker and the like, a storage unit 108 consisting of a hard disk, a non-volatile memory and the like, a communication unit 109 consisting of a network interface and the like, and a drive 110 that drives a removable recording media 111, such as a magnetic disc, an optical disc, a magneto-optical disc or a semiconductor memory, are connected.

In the computer 100 constituted as described above, the CPU 101 loads, for example, a program stored in the storage unit 108 into the RAM 103 through the input/output interface 105 and the bus 104, and executes the program, thereby performing the series of processes described above.

The program executed by the computer may be a program that performs the processes in time series according to a sequence described in this specification, or a program that performs the processes at a required timing such as when calling is performed.

Also, the program may be processed by one computer or processed in a distributed manner by a plurality of computers. Furthermore, the program may be transmitted to a computer at a remote place and executed.

Embodiments of the present technology are not limited to the embodiment described above, and can be modified in various ways without departing from the spirit of the present disclosure.

The present disclosure contains subject matter related to that disclosed in Japanese Priority Patent Application JP 2011-131296 filed in the Japan Patent Office on Jun. 13, 2011, the entire content of which is hereby incorporated by reference.

What is claimed is:

1. An information processing apparatus, comprising:
   a collection unit which collects a document consisting of one or more sentences;
   a topic analysis unit which calculates a probability indicating a degree of fitness of each sentence constituting the collected document for each item of a local topic by performing topic analysis on the collected document;
   a language analysis unit which detects a unique expression pattern in each item of the local topic by performing linguistic analysis on the collected document;
   an evaluation setting unit which sets topic usefulness for each sentence constituting the collected document on the basis of evaluation of the sentence by an evaluator, and sets a total evaluation value with respect to each item of the local topic on the basis of the topic analysis result and the topic usefulness; and
   a profound text extraction unit which selects an item of the local topic on the basis of the total evaluation values, and extracts appropriate sentences for a unique expression pattern in the selected item of the local topic from the collected document as profound text candidates,
   wherein the profound text states knowledge about an attention target by indicating the document that states the local topic relating to the attention target with the unique expression pattern, and sentences of which a degree of profundity is equal to or greater than a predetermined threshold value are recognized as profound text, and
   wherein the collection unit, the topic analysis unit, the language analysis unit, the evaluation setting unit, and the profound text extraction unit are each implemented via at least one processor.

2. The information processing apparatus according to claim 1,
   wherein the profound text extraction unit selects the item of the local topic on the basis of the total evaluation values, and extracts appropriate sentences for the unique expression pattern in the selected item of the local topic from a collected extraction-target document as profound text candidates.

3. The information processing apparatus according to claim 2,
   wherein the evaluation setting unit sets a degree of profundity of each sentence constituting the collected document on the basis of the evaluation of the sentence by the evaluator, performs machine learning on a multidimensional feature quantity and the degree of profundity of the sentence, and thereby determines a boundary of a distribution of profound text over a multidimensional feature quantity space, and
   the profound text extraction unit extracts the profound text from the profound text candidates on the basis of the determined boundary.

4. The information processing apparatus according to claim 3, further comprising
   a presentation unit which presents a profound text candidate corresponding to a designated attention target or the profound text to a user,
   wherein the presentation unit is implemented via at least one processor.

5. The information processing apparatus according to claim 2, further comprising
   an editing unit which edits the collected document,
   wherein the editing unit is implemented via at least one processor.

6. An information processing method of an information processing apparatus including a collection unit which collects a document consisting of one or more sentences, a topic analysis unit which calculates a probability indicating a degree of fitness of each sentence constituting the collected document for each item of a local topic by performing topic analysis on the collected document, a language analysis unit which detects a unique expression pattern in each item of the local topic by performing linguistic analysis on the collected document, an evaluation setting unit which sets topic usefulness for each sentence constituting the collected document on the basis of evaluation of the sentence by an evaluator, and sets a total evaluation value with respect to each item of the local topic on the basis of the topic analysis result and the topic usefulness, and a profound text extraction unit which selects an item of the local topic on the basis of the total evaluation values, and extracts appropriate sentences for a unique expression pattern in the selected item of the local topic from the collected document as profound text candidates, the method comprising:
   collecting, by the collection unit, a learning-target document consisting of one or more sentences;
   performing, by the topic analysis unit, topic analysis on the collected learning-target document to calculate a probability indicating a degree of fitness of each sentence constituting the learning-target document for each item of a local topic;
   performing, by the language analysis unit, linguistic analysis on the collected learning-target document to detect a unique expression pattern in each item of the local topic;
   setting, by the evaluation setting unit, topic usefulness for each sentence constituting the collected learning-target document on the basis of evaluation of the sentence by an evaluator, and setting a total evaluation value with respect to each item of the local topic on the basis of the topic analysis result and the topic usefulness;
   collecting, by the collection unit, an extraction-target document consisting of one or more sentences; and
   selecting, by the profound text extraction unit, an item of the local topic on the basis of the total evaluation values, and extracting an appropriate sentence for a unique expression pattern in the selected item of the local topic from the collected extraction-target document as a profound text candidate,
   wherein the profound text states knowledge about an attention target by indicating the document that states the local topic relating to the attention target with the unique expression pattern, and sentences of which a degree of profundity is equal to or greater than a predetermined threshold value are recognized as profound text.

7. A non-transitory computer-readable medium having embodied thereon a program, which when executed by a computer causes the computer to perform a method, the method comprising:
   collecting a document consisting of one or more sentences;
   calculating a probability indicating a degree of fitness of each sentence constituting the collected document for each item of a local topic by performing topic analysis on the collected document;
   detecting a unique expression pattern in each item of the local topic by performing linguistic analysis on the collected document;
   setting topic usefulness for each sentence constituting the collected document on the basis of evaluation of the sentence by an evaluator, and setting a total evaluation value with respect to each item of the local topic on the basis of the topic analysis result and the topic usefulness; and selecting an item of the local topic on the basis of the total evaluation values, and extracting appropriate sentences for a unique expression pattern in the selected item of the local topic from the collected document as profound text candidates, wherein the profound text states knowledge about an attention target by indicating the document that states the local topic relating to the attention target with the unique expression pattern, and sentences of which a degree of profundity is equal to or greater than a predetermined threshold value are recognized as profound text.

\* \* \* \* \*